(12) United States Patent
Giangrande et al.

(10) Patent No.: US 10,527,302 B2
(45) Date of Patent: Jan. 7, 2020

(54) VENTILATION ASSEMBLY FOR A HEAT EXCHANGER

(71) Applicant: Johnson Electric S.A., Murten (CH)

(72) Inventors: Giovanni Giangrande, Asti (IT); Roberto Almondo, Monta d'Alba (IT); Andrea Carrer, Asti (IT)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 171 days.

(21) Appl. No.: 15/793,418

(22) Filed: Oct. 25, 2017

(65) Prior Publication Data
US 2018/0112885 A1 Apr. 26, 2018

(30) Foreign Application Priority Data
Oct. 25, 2016 (IT) .................. 102016000107144

(51) Int. Cl.
| | |
|---|---|
| *F24F 7/06* | (2006.01) |
| *F01P 5/06* | (2006.01) |
| *F01P 11/10* | (2006.01) |
| *F28D 9/00* | (2006.01) |
| *F04D 29/54* | (2006.01) |
| *F28F 9/02* | (2006.01) |
| *H01R 13/60* | (2006.01) |
| *B60H 1/00* | (2006.01) |

(Continued)

(52) U.S. Cl.
CPC .......... *F24F 7/065* (2013.01); *B60H 1/00464* (2013.01); *B60H 1/00521* (2013.01); *B60K 11/04* (2013.01); *F01P 5/06* (2013.01); *F01P 11/10* (2013.01); *F04D 25/0693* (2013.01); *F04D 25/08* (2013.01); *F04D 29/544* (2013.01); *F28D 9/005* (2013.01); *F28F 9/0251* (2013.01); *H01R 13/60* (2013.01); *F01P 2070/50* (2013.01); *F28D 2021/0094* (2013.01); *F28F 9/002* (2013.01)

(58) Field of Classification Search
CPC ........ H01R 13/60; H01R 13/73; H01R 13/74; H01R 13/743; F16L 3/01; F16L 3/02; F16L 3/08; F24F 7/065
USPC ....................................................... 439/528
See application file for complete search history.

(56) References Cited

U.S. PATENT DOCUMENTS

| | | | |
|---|---|---|---|
| 7,867,024 B2 * | 1/2011 | Fraysse .............. | H01R 13/6273 439/575 |
| 10,312,642 B2 * | 6/2019 | Namiki .................. | H01R 13/74 |

(Continued)

FOREIGN PATENT DOCUMENTS

| | | | | |
|---|---|---|---|---|
| JP | 2534051 Y2 * | 4/1997 | | |
| WO | WO-2007010097 A1 * | 1/2007 | ........... | H01R 13/443 |

*Primary Examiner* — Steven S Anderson, II
(74) *Attorney, Agent, or Firm* — Muncy, Geissler, Olds & Lowe, P.C.

(57) ABSTRACT

A ventilation assembly for a heat exchanger of a motor vehicle is provided, which includes a main body with a main opening, an electric fan mounted in the main opening, a connector and a retaining structure arranged on the main body. The electric fan includes an impeller and an associated electric driving motor. The connector is connected to the electric motor via an electric cable, and includes a plurality of terminals. The retaining structure includes a cavity having an open side for inserting the connector and a closed side for preventing an external access to the terminals of the connector, and a retaining member to retain the connector.

13 Claims, 4 Drawing Sheets

(51) Int. Cl.
  *B60K 11/04* (2006.01)
  *F04D 25/08* (2006.01)
  *F04D 25/06* (2006.01)
  *F28D 21/00* (2006.01)
  *F28F 9/00* (2006.01)

(56) References Cited

U.S. PATENT DOCUMENTS

2013/0156619 A1* 6/2013 Speretta .............. F04D 25/0693
  417/423.7
2016/0111817 A1* 4/2016 Linderman .......... H01R 13/443
  439/345

* cited by examiner

VENTILATION ASSEMBLY FOR A HEAT EXCHANGER

CROSS REFERENCE TO RELATED APPLICATIONS

This non-provisional patent application claims priority under 35 U.S.C. § 119(a) from Patent Application No. 102016000107144 filed in Italy on Oct. 25, 2016, the entire contents of which are hereby incorporated by reference.

FIELD OF THE INVENTION

This invention relates to a ventilation assembly, in particular to a ventilation assembly for a heat exchanger such as a radiator of a motor vehicle.

BACKGROUND OF THE INVENTION

A conventional ventilation assembly for a car heat exchanger includes an essentially plate-like main body, having an opening forming a passage for a flow of air, and an electric fan mounted in the opening. The electric fan includes an impeller having a central hub from which a plurality of blades extends, and an electric motor fixed to a support structure in the central area of the passage and connected to the hub of the impeller. The ventilation assembly has a flexible electric cable with one end connected to the electric motor and the other end connected to a connector. The connector is configured to connect an external electrical circuit, typically an external power supply and/or a control circuit.

Generally, during the ventilation assembly is transported from a manufacturer site to an assembly site, the connector has not been connected to the external power supply and/or the control circuit. The connector is liable to be damaged. In addition, dust is liable to enter and accumulate in the connector.

SUMMARY OF THE INVENTION

Hence there is a desire for a ventilation assembly, which makes it possible to remedy this problem.

Accordingly, in one aspect thereof, the present invention provides a ventilation assembly for a heat exchanger, particularly for a motor vehicle, which comprises a main body with an opening; an electric fan mounted in the opening, comprising an impeller and an associated electric driving motor; a flexible electric cable, with one end connected to the electric motor and the other end connected to a connector for connecting a power supply or an associated control circuit. The connector has a plurality of terminals which are accessible from an outside of the connector. A retaining structure is disposed on the main body, configured to receive at least a part of the connector under a condition that the connector is disconnected from the power supply or the associated control circuit. The retaining structure comprises a substantially box-shaped formation defining a cavity, the box-shaped formation having an open side for inserting the connector and a closed side for preventing an external access to the terminals of the connector. The retaining structure further comprises a retaining member arranged between the open side and the closed side to retain the connector.

Preferably, the connector comprises a corresponding engagement member engaged with the retaining member.

Preferably, the box-shaped formation comprises a first side wall and a second side wall arranged side by side between the open side and the closed side.

Preferably, the closed side is an end wall, the retaining member extends from a top side of the end wall, and the engagement member protrudes from a top side of the connector.

Preferably, the box-shaped formation further comprises a bottom wall disposed between the first side wall and second side wall and corresponding to the retaining member.

Preferably, the bottom wall has a stopping wall extending substantially perpendicular to the bottom wall.

Preferably, the main body further has a secondary opening which comprises four edges, the first side wall, the second side wall, the end wall and the bottom wall respectively extends from the four edges, and the bottom wall is disconnected with the first side wall, the second side wall, and the end wall.

Preferably, the connector abuts the end wall.

Preferably, the box-shaped formation further comprises a top wall arranged between the first side wall and the second side wall, the top wall comprises a first section and a second section, and wherein the retaining member is arranged between the first section and the second section, and spaced with the first section and the second section.

Preferably, the box-shaped formation is molded from substantially rigid plastic material.

Accordingly, in another aspect thereof, the present invention provides a ventilation assembly for a heat exchanger, particularly for a motor vehicle, which comprises a main body with an opening; an electric fan mounted in the opening, comprising an impeller and an associated electric driving motor; and a connector connected to the electric motor via an electric cable, and having at least one connection aperture for connecting a power supply or an associated control circuit. A retaining structure is arranged on the main body, and comprises a cavity for receiving at least a part of the connector and closing the at least one connection aperture. The retaining structure further comprise a retaining member, the connector comprises a corresponding engagement member engaged with the retaining member.

Preferably, the cavity comprises an open side for inserting the connector and a closed side for preventing an external access to terminals of the connector, and the retaining member is arranged between the open side and the closed side.

In the embodiments of the present disclosure, the retaining structure can accommodate and retain the connector, and thus protect the connector and prevent dust from entering the connector during transport.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

The technical solutions of the embodiments of the present invention will be clearly and completely described as follows with reference to the accompanying drawings. Apparently, the embodiments as described below are merely part of, rather than all, embodiments of the present invention. Based on the embodiments of the present disclosure, any other embodiment obtained by a person skilled in the art without paying any creative effort shall fall within the protection scope of the present invention.

It is noted that, when a component is described to be "fixed" to another component, it can be directly fixed to the another component or there may be an intermediate component. When a component is described to be "connected" to another component, it can be directly connected to the another component or there may be an intermediate component. When a component is described to be "disposed" on another component, it can be directly disposed on the another component or there may be an intermediate component. The directional phraseologies such as "perpendicular", "horizontal", "left", "right" or similar expressions are for the purposes of illustration only.

Unless otherwise specified, all technical and scientific terms have the ordinary meaning as understood by people skilled in the art. The terms used in this disclosure are illustrative rather than limiting. The term "and/or" as used in this disclosure means that each and every combination of one or more associated items listed are included.

Figure 1:
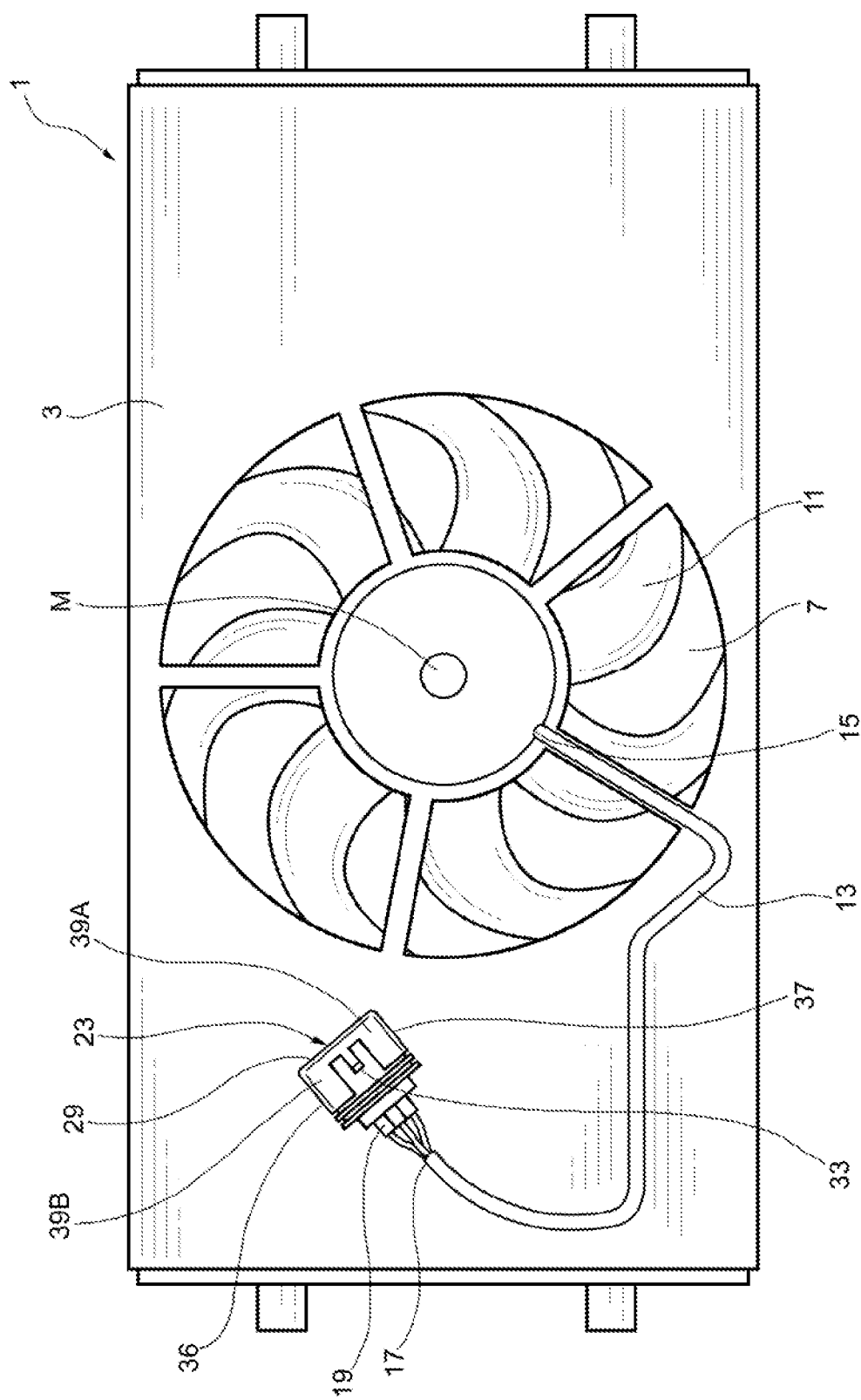
FIG. 1 is a front view of a ventilation assembly according to a preferred embodiment of the present invention.
Figure 2:
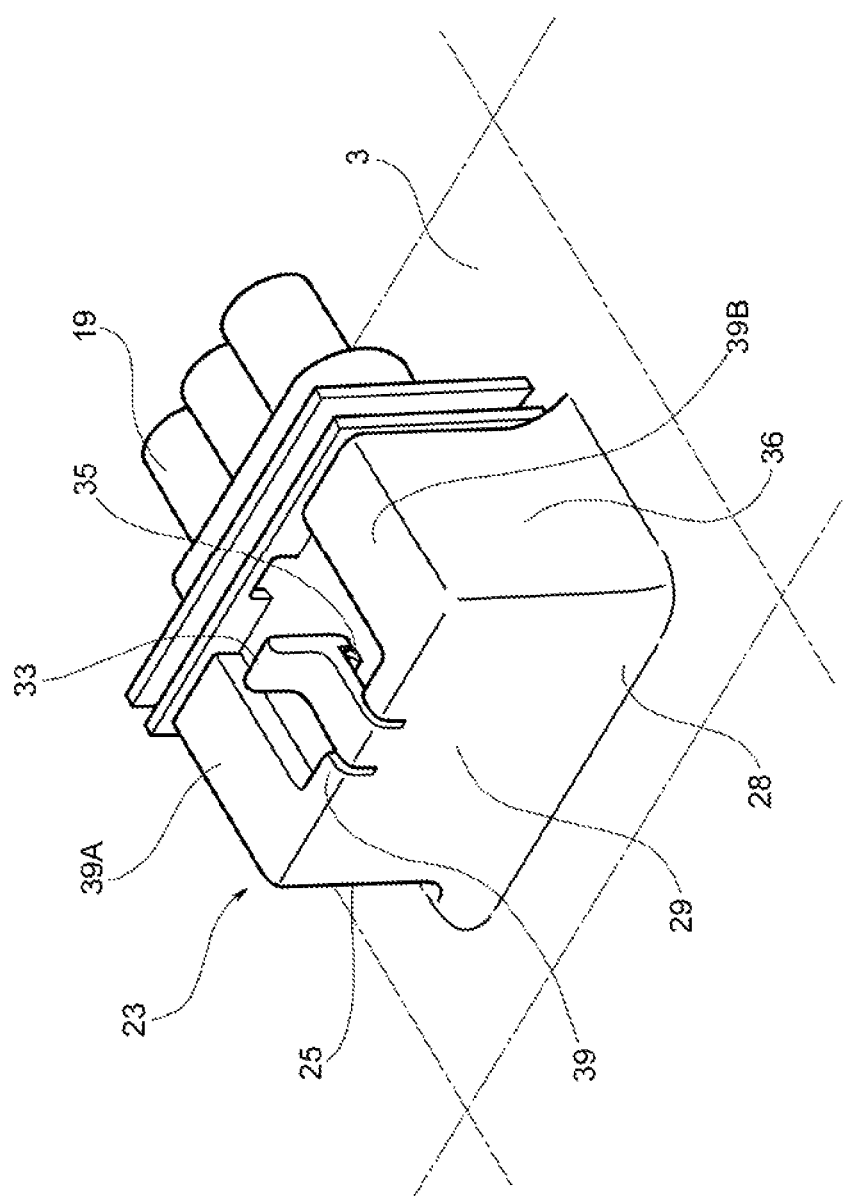
FIG. 2 is a perspective view of a retaining structure of FIG. 1, with a connector fitted therein.
Figure 3:
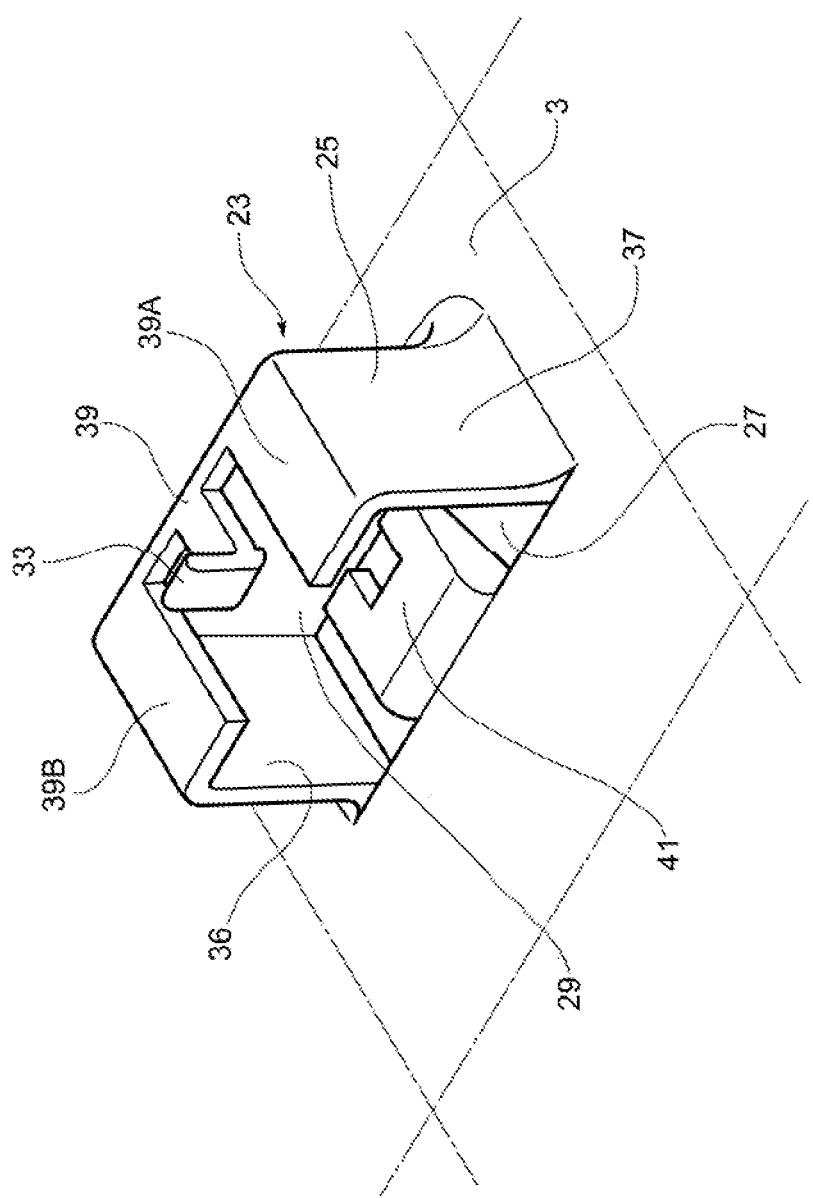
FIG. 3 is a perspective view of a box-shaped formation of FIG. 2.
Figure 4:
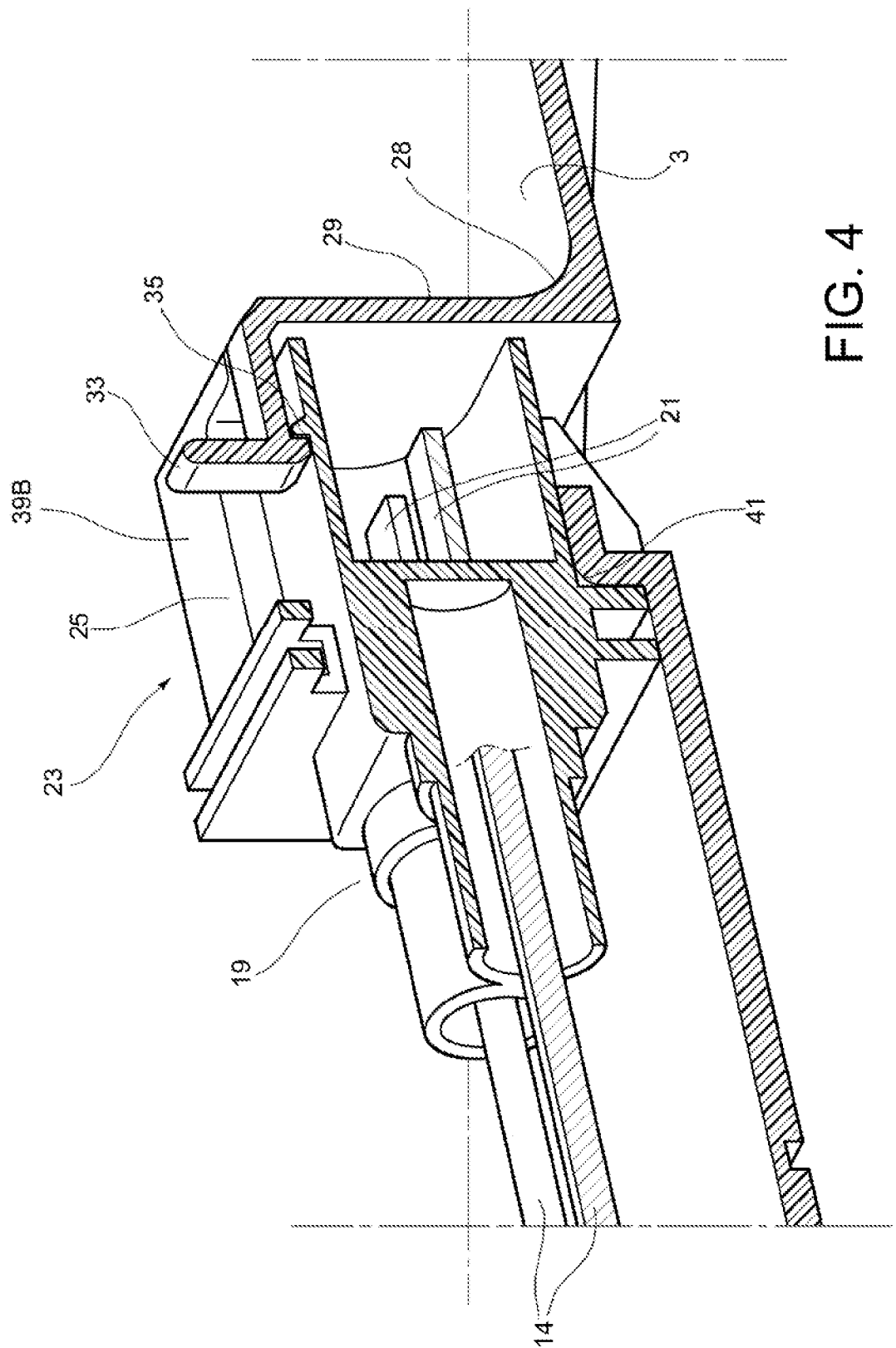
FIG. 4 is a cross section enlarged view of FIG. 2.

Referring to FIGS. 1 to 4, which illustrate a preferred embodiment of a ventilation assembly for a heat exchanger of a motor vehicle.

The ventilation assembly 1 includes an essentially plate-like main body 3 configured to be installed in a vehicle compartment. The main body 3 has an essentially circular main opening 7, forming a passage for a flow of air. An electric fan is mounted in the main opening 7. The electric fan includes an impeller having a central hub (not shown) from which a plurality of blades 11 extends, and an associated electric motor M for driving the impeller. The central hub of the impeller is connected to the electric motor M which is fixed to a support structure in the central area of the main opening 7.

In the embodiment, the electric motor M may be a brushless motor. The electrical motor M is connected to a flexible electric cable 13 with a certain length. One end 15 of the electric cable 13 is connected to the electric motor M, and the other end 17 of the cable 13 is connected to a connector 19. The connector 19 is configured to connect to an external power supply (not shown) or an external control circuit (not shown).

The flexible electric cable 13 includes a plurality of electric wires 14. The number of the electric wires 14 is two or more, such as two wires for powering the electric motor M and one wire for a control signal.

The connector 19 has at least one connection aperture (not labeled) and a plurality of terminals 21 accommodated in the connection aperture. The terminals 21 are accessible from the outside of the connection aperture. During the operation of the ventilation assembly 1, the connector 19 will be engaged to a corresponding connector (not shown), and the terminals 21 will be in contact with corresponding connecting terminals to receive power supply and/or control signals.

The ventilation assembly 1 further includes a retaining structure 23 provided on the main body 3. This retaining structure 23 is configured to accommodate and retain at least a part of the connector 19 under a condition that the connector 19 is disconnected from the external power supply or the external control circuit. For example, the retaining structure 23 accommodates and retains the connector 19 during the ventilation assembly 1 is transported from the manufacturing site to the customer site.

The distance between the retaining structure 23 and the motor is smaller than the length of the electric cable 13. Preferably, the retaining structure 23 is disposed in the proximity of the main opening 7.

The retaining structure 23 includes a box-shaped formation 25 defining a cavity configured to accommodate at least a part of the connector 19. The box-shaped formation 25 has an open side 27 for inserting the connector 19 and a closed side 28 opposite to the open side 27. The closed side 28 is an end wall 29, configure for closing the connection aperture of the connector 19 when the connector 19 is inserted into the retaining structure 23, and thus preventing an external access to the terminals 21. Preferably, the connector 19 may abut the end wall 29 of the box-shaped formation 25.

In the embodiment, the retaining structure 23 may be molded from at least a substantially rigid plastic material. In alternative embodiments, the retaining structure 23 also may be made from a different material, such as a thin metal foil.

The box-shaped formation 25 further includes a retaining member 33 to retain the connector 19. The connector 19 includes a corresponding engagement member 35. The retaining member 33 is engaged with the engagement member 35 to retain the connector 19 when the connector 19 is inserted into the box-shaped formation 25. Preferably, the retaining member 33 is disposed between the open side 27 and the closed side 28.

In the embodiment, the box-shaped formation 25 includes a first side wall 36 and a second side wall 37. The two side walls 36, 37 are arranged side-by-side between the open side 27 and the closed side 28, and configured for preventing a transverse movement of the connector 19.

In the embodiment, the retaining member 33 includes a retaining plate (not labeled) perpendicularly extends from the top side of the end wall 29, a fixing portion (not labeled) formed on the end of the retaining plated. The engagement member 35 protrudes from the top side of the connector 19 for engaging with the fixing portion to prevent the connector 19 from moving off the box-shaped formation 25. The engagement member 35 may be, but is not limited to, substantially triangular.

Preferably, the box-shaped formation 25 further includes a top wall 39 arranged between the first side wall 36 and the second side wall 37. The top wall 39 includes a first section 39A and a second section 39B. The retaining member 33 is arranged between the first section 39A and the second section 39B. Two gaps (not labeled) are respectively formed between the corresponding sections 39A, 39B and the retaining member 33.

Preferably, the box-shaped formation 25 further includes a bottom wall 41 arranged between the two side walls 36, 37. The bottom wall 41 is configured to provide a longitudinal force to the connector 19 and ensure a snap engagement between the retaining member 33 and the engagement member 35 when the connector 19 is inserted into the box-shaped formation 25. The connector 19 can be extracted from the box-shaped formation 25 by a longitudinal force perpendicular to a direction for inserting the connector 19 applied to the retaining member 33. Preferably, the bottom wall 41 has a stopping wall (not labeled) extending substantially perpendicular to the bottom wall 41, which is configured for limiting a forward movement of the connector 19. Preferably, the bottom wall 41 is corresponding to the retaining member 33, and not connected with the two side walls 36, 37 and the end wall 29. Three gaps (not labeled) are respectively formed between the bottom wall 41 and the corresponding walls 36, 37, 29.

In the embodiment, the box-shaped formation 25 is made integrally with the main body 3. The main body 3 further has a secondary opening with four edges (not labeled). The two side walls 36, 37, the end wall 29, and the bottom wall 41 respectively extends from the four edges. In alternative embodiments, at least a part of the box-shaped formation 25 also may be separate, and fixed on the main body 3.

It should be understood that the retaining member 33 will not be limited to extend from the end wall 29. The retaining member 33 also may be arranged on or extends from the side walls 36, 37 or the end wall 29. Correspondingly, the engagement member 35 also may be arranged on a corresponding side of the connector 19.

Advantageously, the retaining structure 23 can accommodate and retain the connector 19, and thus protect the connector 19 and prevent dust from entering the connector 19 during transport.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

The invention claimed is:

1. A ventilation assembly for a heat exchanger of a motor vehicle, comprising:
    a main body with a main opening,
    an electric fan mounted in the main opening, comprising an impeller and an associated electric motor,
    a flexible electric cable, with one end connected to the electric motor and another end connected to a connector for connecting a power supply or an associated control circuit, the connector having a plurality of terminals which are accessible from an outside of the connector,
    wherein a retaining structure is disposed on the main body, configured to receive at least a part of the connector under a condition that the connector is disconnected from the power supply or the associated control circuit,
    the retaining structure comprises a substantially box-shaped formation defining a cavity, the box-shaped formation having an open side for inserting the connector and a closed side for preventing an external access to the terminals of the connector,
    the retaining structure further comprises a retaining member arranged between the open side and the closed side to prevent the connector from falling off, and a bottom wall,
    the bottom wall and the retaining member are respectively disposed at a bottom side and a top side of the box-shaped formation, and
    the bottom wall has a supporting portion which is closer to the top side of the retaining structure than the main body in a vertical direction, for supporting the connector, and a stopping portion connected between the supporting portion and the main body, to engage a flange of the connector, for limiting a forward movement of the connector in an inserting direction of the connector.

2. The ventilation assembly according to claim 1, wherein the connector comprises a corresponding engagement member engaged with the retaining member.

3. The ventilation assembly according to claim 2, wherein the box-shaped formation comprises a first side wall and a second side wall arranged side by side between the open side and the closed side.

4. The ventilation assembly according to claim 3, wherein the closed side is an end wall, the retaining member extends from a top side of the end wall, and the engagement member protrudes from a top side of the connector.

5. The ventilation assembly according claim 4, wherein the box-shaped formation further comprises a bottom wall disposed between the first side wall and second side wall and corresponding to the retaining member.

6. The ventilation assembly according to claim 5, wherein a profile of the bottom wall is substantially L-shaped.

7. The ventilation assembly according to claim 5, wherein the main body further has a secondary opening which comprises four edges, the first side wall, the second side wall, the end wall and the bottom wall respectively extends from the four edges, and the bottom wall is disconnected with the first side wall, the second side wall, and the end wall.

8. The ventilation assembly according to claim 4, wherein the connector abuts the end wall.

9. The ventilation assembly according to claim 3, wherein the box-shaped formation further comprises a top wall arranged between the first side wall and the second side wall, the top wall comprises a first section and a second section, and wherein the retaining member is arranged between the first section and the second section, and spaced with the first section and the second section.

10. The ventilation assembly according to claim 1, wherein the box-shaped formation is molded from substantially rigid plastic material.

11. A ventilation assembly for a heat exchanger of a motor vehicle, comprising:
    a main body with a main opening,
    an electric fan mounted in the main opening, comprising an impeller and an associated electric motor,
    a connector connected to the electric motor via an electric cable, and having at least one connection aperture for connecting a power supply or an associated control circuit,
    wherein a retaining structure is arranged on the main body, and comprises a substantially box-shaped formation defining a cavity for receiving at least a part of the connector and closing the at least one connection aperture,
    the retaining structure further comprises a retaining member, the connector comprises a corresponding engagement member engaged with the retaining member,
    the box-shaped formation further comprises a bottom wall for supporting the connector,
    the bottom wall and the retaining member are respectively disposed at a bottom side and a top side of the box-shaped formation, and a profile of the bottom wall is substantially L-shaped, with a supporting portion for supporting the connector, and a stopping portion connected between the supporting portion and the main body, for engaging a flange of the connector.

12. The ventilation assembly according to claim 11, wherein the cavity comprises an open side for inserting the connector and a closed side for preventing an external access to terminals of the connector, and the retaining member is arranged between the open side and the closed side.

13. The ventilation assembly according to claim 11, wherein the box-shaped formation comprises a top wall having a first section and a second section, the retaining member is arranged between and spaced with the two sections, with an arm extending along an inserting direction of the connector, and an operable handle is arranged on the arm and substantially perpendicular to the arm.

* * * * *